Jan. 23, 1934.  A. F. LARSEN  1,944,438
PERCOLATOR HEATER
Filed July 1, 1932   2 Sheets-Sheet 1
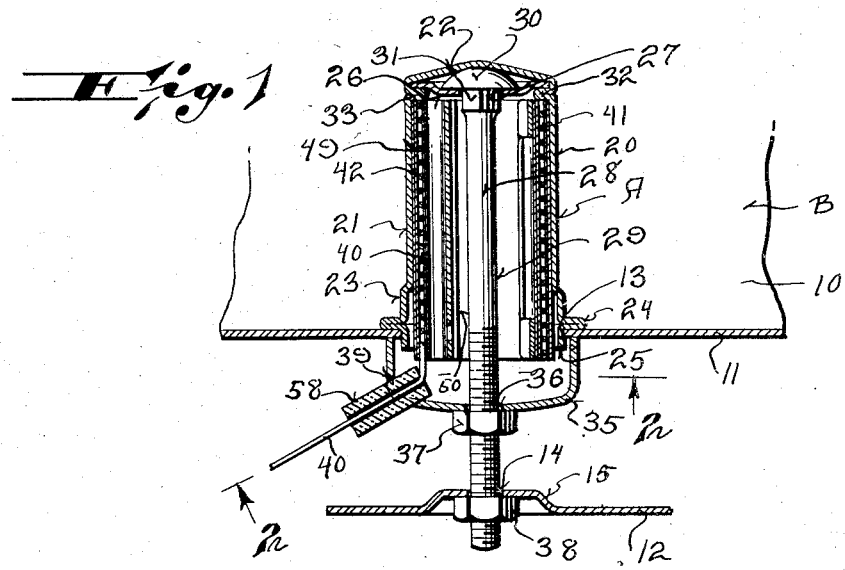
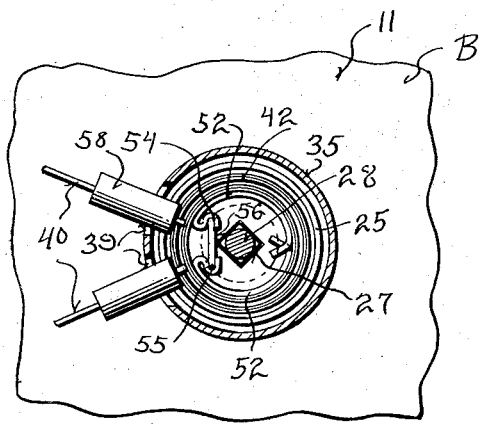
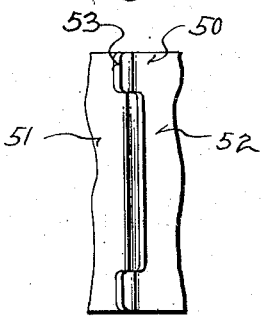
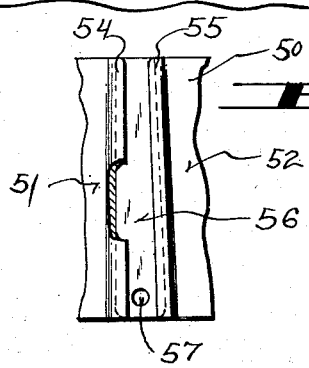
Inventor
A. F. Larsen
By ... 
Attorneys Jan. 23, 1934.  A. F. LARSEN  1,944,438
PERCOLATOR HEATER
Filed July 1, 1932  2 Sheets-Sheet 2
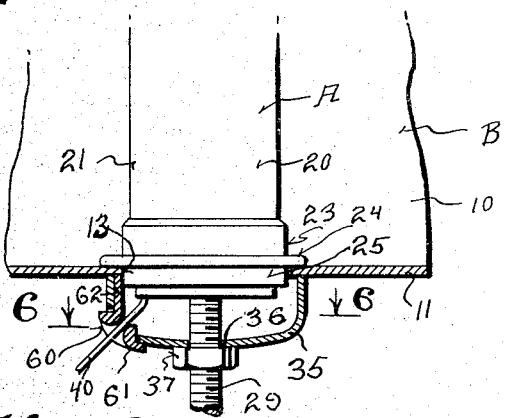
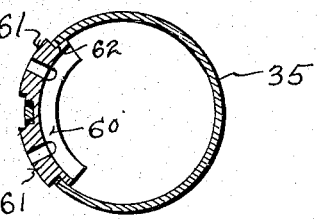
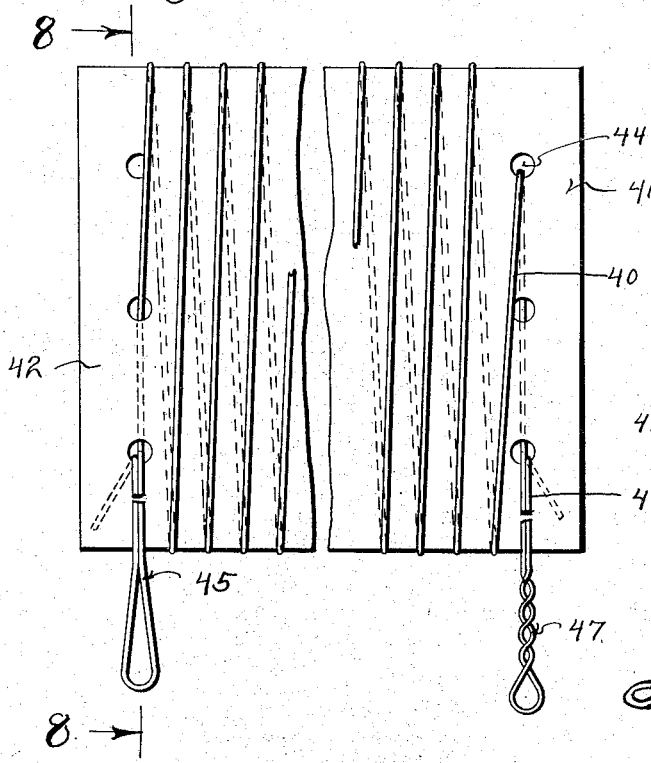
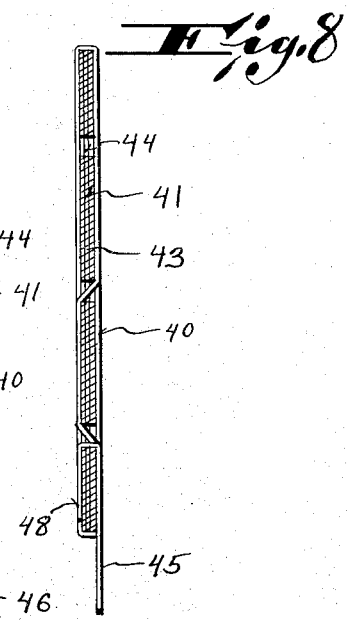

Patented Jan. 23, 1934

1,944,438

UNITED STATES PATENT OFFICE 1,944,438

PERCOLATOR HEATER

Alantser F. Larsen, Manitowoc, Wis., assignor to Aluminum Goods Manufacturing Company, Manitowoc, Wis.

Application July 1, 1932. Serial No. 620,311

6 Claims. (Cl. 219—44)

This invention relates to electric heaters of the immersion type and more particularly to electric heating units particularly susceptible for use in conjunction with coffee percolators, but which is capable of other uses.

One of the primary objects of my invention is the provision of novel means for forming the shell or housing for receiving the electric heating element and novel means for associating the head of the securing bolt for the shell therewith, whereby a limited rocking movement of the bolt is permitted so that the bolt can be readily passed through openings formed in the retaining cap for the shell and the base of the pot, should the bolt and openings be slightly out of alinement and thereby facilitate the assembling of the heating unit and the pot.

Another salient object of my invention is the provision of novel means for forming the core for the resistance wire, whereby the wire can be readily wound thereon and whereby the core can be easily and conveniently associated with the shell or housing of the heater after the holding bolt has been associated with said shell.

A further important object of my invention is the provision of a core for the electric resistance wire embodying a series of super-imposed thin mica or other insulating strips or plates around which the wire can be readily wound, the ends of the strips or plates having novel means for receiving the terminals of the resistance wire, the plurality of thin mica strips or plates allowing the core to be readily rolled into cylindrical form for insertion in the shell or housing.

A further object of my invention is the provision of novel means for removably clamping the rolled core within the shell, whereby the same will be disposed in close relation to the walls of the shell so as to quickly heat the liquid surrounding the shell, the wires being insulated from the shell preferably by mica strips.

A further object of my invention is the provision of novel means for forming the retaining means for the core, whereby the same can be quickly assembled or taken apart to permit the removal or association of the core with the shell.

A further object of my invention is the provision of novel means for forming the openings in the edges of the sheets of insulation for receiving the ends of the resistance wire whereby the sheets can be readily and easily assembled without the necessity of careful alining of the openings.

A further object of my invention is the provision of novel means for forming the ends of the resistance wire to form the terminals, whereby any pulling strain on the wires will be readily transmitted to the insulating plates.

A further object of my invention is the provision of novel means for passing the terminals of the wires through the retaining cap and for holding the terminals in place, whereby all danger of the wires coming into electrical contact with metal parts of the device is eliminated.

A still further object of my invention is to provide an electric immersion heater of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a longitudinal section through my improved electric heater unit showing the same associated with an electric percolator or like receptacle, only parts of the percolator being shown.

Figure 2 is a detail horizontal section taken on the line 2—2 of Figure 1 looking in the direction of the arrows.

Figure 3 is a fragmentary side elevation of the retaining member for the electric heating unit illustrating the means for hingedly connecting the sections thereof together.

Figure 4 is a similar view illustrating the means for spreading the sections thereof for holding the electric unit in place in its shell or housing.

Figure 5 is a view similar to Figure 1 illustrating a slightly modified form of insulator for the terminals of the resistance wire.

Figure 6 is a detail horizontal section taken on the line 6—6 of Figure 5.

Figure 7 is a detail elevation taken on an enlarged scale showing the electric heating unit prior to the rolling thereof into cylindrical form.

Figure 8 is a transverse section through the heating unit taken on the line 8—8 of Figure 7 looking in the direction of the arrows illustrating the novel means of forming the core or form for the resistance wire.

Referring to the drawings in detail, wherein similar reference characters designate the corresponding parts throughout the several views, the letter A generally indicates my improved electric immersion heater and B a receptacle with which the same can be associated.

The receptacle B can be considered as a coffee percolator and the same embodies the pot 10 having a bottom wall 11 and a spaced shield plate 12 which forms a part of the base of the percolator. The bottom wall 11 is provided with an enlarged opening 13 for a purpose, which will be later set forth. The shield plate 12 is provided with a smaller opening 14 in alinement with the large opening 13 and the portion of the plate 12 surrounding the opening can be offset or struck inwardly as at 15, if desired.

My improved electric heating unit comprises a cylindrical shell or housing 20 which can be formed of aluminum if so desired. This shell or housing 20 embodies a cylindrical side wall 21 and an integral connecting top wall 22 which can be slightly crowned or bowed upwardly if preferred. The lower end of the side wall 21 can be slightly flared as at 23 and folded to provide an outstanding bottom wall engaging flange 24. Below the flange the side wall 21 is provided with an apron extension 25. This apron can be snugly fitted within the opening 13 and depends below the bottom face of the lower wall 11 of the pot. As shown in Figure 1, the flange 24 rests upon the upper face of the bottom wall.

As heretofore intimated, one of the main features of my invention is the provision of the novel means for associating the retaining bolt for the unit with the shell or housing. This means comprises a holding plate or washer 26 having an axially disposed polygonal opening 27. The retaining bolt 28 is of an elongated character and embodies the shank 29 and head 30. The shank 29 adjacent to the head 30 is provided with a polygonal portion 31 on which the washer 26 is placed. The washer engages the inner face of the bolt head and if preferred the washer can be struck-out for receiving the head of the bolt and to provide an annular outstanding flange portion 32. It is to be noted that the outer curved face of the bolt head rests in engagement with the crowned face of the top wall 22 of the shell or housing. As clearly shown in Figure 1, the side wall 21 of the shell or housing is folded inwardly to provide a retaining flange 33. This retaining flange 33 engages the flange of the washer and clamps the washer firmly in position. By this construction the bolt is housed entirely within the shell and none of the liquid from the receptacle can gain access thereto and the bolt can be quickly and easily associated with the shell at the time of the forming thereof. The opening in the washer is slightly greater than the diameter of the bolt and this allows the rocking of the bolt, for a purpose, which will be later set forth.

The shell is retained in liquid tight connection with the bottom wall 11 of the pot by means of a retaining cap or cup 35 which is arranged in opposite relation to the shell. This cap at its axial center is provided with an opening 36 through which the shank of the bolt extends. A nut 37 can be threaded on the shank into engagement with the cap for forcing the cap into close contact with the lower face of the bottom wall 11 and for urging the flange 24 into intimate relation with the upper face of the bottom wall. The extreme lower end of the shank extends through the opening 14 in the shield plate 12 and a nut 38 is threaded on the shank against this plate. The offset portion 15 of the plate provides a partial housing for this nut. The cap 35 at one side of the opening 36 can be provided with spaced openings 39 through which the ends of the resistance wire 40 of the heating unit 41 can extend.

The heating unit 41 is made in a novel manner and forms one of the essential features of my invention. This unit embodies an insulating form or core 42 on which the wire 40 is wound. As shown, the form or core embodies a plurality of thin sheets 43 of insulation, such as mica. The form or core is made of laminations in order to avoid cracking of the sheets when the same are rolled into cylindrical form, as will be later described. Adjacent to the side edges of the form or core the sheets are provided with alined openings 44. All of the openings are formed in the same manner in the various sheets, so that the sheets can be readily assembled by an operator without danger of misalining the openings. The resistance wire 40 is wound about the form or core while the same is in its flat condition and one end 45 of the wire is passed through one intermediate opening and the lower opening while the end 46 of the wire is threaded through the two outermost openings on the other side of the form. The ends of the wires are bent back upon themselves for the sake of durability and can be twisted together as at 47. The extreme ends of the wires are reinserted through the lowermost openings and are bent back upon themselves as at 48 against the form. This forms a durable connection and relieves strain on the wire should undue pull be exerted thereon.

After the resistance wire 40 has been wound in the form, the form is rolled into cylindrical shape for insertion within the shell or housing 20 and sheets of insulation 49, such as mica, can be placed between the shell and the resistance wire. This will effectively insulate the wire from the shell and prevent the wire from contacting with the shell.

I provide novel means for holding the heating unit within the shell against displacement and for urging the unit into close contact with the side wall 21 of the shell, whereby the heat radiated from the resistance wire will be readily transmitted to the shell. This means embodies a clamp or retaining device 50 which includes a pair of companion semi-cylindrical sections or jaws 51 and 52. The meeting edges of the jaws 51 and 52 at one side are provided with companion interlocking ears 53 so as to permit the sections or jaws 51 and 52 to swing relative to one another. The opposite edges of the sections are bent inwardly to provide substantially U-shaped guide tracks 54 and 55. These tracks 54 and 55 converge toward their upper ends and a wedge plate 56 is adapted to be inserted in said tracks for spreading the sections 51 and 52 outwardly into engagement with the heating unit. The lower end of the wedge plate 56 is provided with an opening 57 whereby a suitable tool can be connected therewith for pulling the wedge plate from out of position when it is desired to remove the heating unit for any reason.

In associating the heating unit with the shell, the same is placed in the shell in its cylindrical form after which the sections 51 and 52 of the clamping device is inserted in the shell in its collapsed position. The wedge plate 56 is then slid into the tracks 54 and 55, which as stated will spread the sections 51 and 52 and firmly clamp the heating unit in place.

The terminals of the resistance wire can be threaded through suitable sleeves 58 of insulation, which can be fitted within the openings 39 formed in the cap 35. These sleeves 58 can be formed from refractory material and serve as an efficient means for insulating the wire from the cap.

If preferred, I can substitute a block 60 for the sleeves 58 and this block can be provided with hollow nipples 61, which can be extended through the openings in the cap. The ends of the resistance wire in this instance are threaded through nipples 61. By providing the block 60 I am enabled to efficiently clamp the insulator in position in that the same can be provided with a flange 62 which can be held between the cap 35 and the apron 25 on the shell or housing 20.

From the foregoing description, it can be seen that I have provided an exceptionally simple and novel form of immersion heater with novel means for constructing and associating the heating unit thereof with the protecting shell or housing.

Changes in details may be made without departing from the spirit or the scope of this invention, but what I claim as new is:

1. In an electric heating device, the combination of a vessel having a wall provided with an opening, a protecting shell arranged within the vessel having a flange engaging the inner face of the wall and an apron extending through the opening, a bolt extending longitudinally through the shell having its head loosely connected with the shell whereby the bolt is free for limited swinging movement, an electric heating element within the shell surrounding the bolt, a retaining cap having an opening receiving the bolt, means on the bolt for holding the cap in intimate contact with the outer face of the wall and the flange in contact with the inner face of the wall, a shield plate having an opening receiving the bolt, and means on the bolt for retaining the shield plate in position.

2. In an electric immersion heater, a protecting shell including a side wall and an integral outer wall, a washer arranged within the shell, a struck-in flange on the side wall for clamping the washer in engagement with the outer wall, and a retaining bolt extending through the washer having its head confined between the outer wall and the washer, said bolt being loosely carried by the washer whereby the same can have a limited swinging movement.

3. In an electric immersion heater, a protecting shell including a side wall and an integral outer wall, a washer having a depressed central portion provided with an axial opening, said depressed portion defining an annular flange, said outer wall being bowed outwardly, a retaining bolt extending through said opening with its head arranged in the depressed portion of the washer, and a struck-in flange formed on the side wall of the shell holding the flange of the washer in contact with the inner face of the outer wall.

4. In an electric immersion heater, a protecting shell including a side wall and an integral outer wall, a washer having a depressed central portion provided with an axial opening, said depressed portion defining an annular flange, said outer wall being bowed outwardly, a retaining bolt extending through said opening with its head arranged in the depressed portion of the washer, and a struck-in flange formed on the side wall of the shell holding the flange of the washer in contact with the inner face of the outer wall, said opening and that portion of the shank passing through the opening being of a polygonal configuration, the opening being of greater size than the shank whereby limited swinging movement of the bolt is permitted.

5. In an electric heating device, a receptacle having a wall provided with an opening, a protecting shell including a side wall having an outstanding flange engaging the inner face of the wall and an apron extending through the opening, an electric heating unit arranged within the shell including a resistance wire having depending terminals, a retaining cap fitted against the outer face of the wall in opposing relation to said flange, means for drawing the shell and cap toward one another, the cap being provided with openings for the terminals, a block of insulation having nipples fitted in said openings, the nipples receiving the terminals, and said block of insulation being provided with a flange confined between the cap and the apron.

6. An electric immersion heating element comprising a shell having integral imperforate top and side walls, a washer secured in the upper end of the shell by crimping a portion of the shell over the washer, a retaining bolt extending through the washer and having its head confined between the top wall of said shell and the washer, and an electric resistance positioned within said shell and surrounding said bolt.

ALANTSER F. LARSEN.